United States Patent [19]

Crumb et al.

[11] Patent Number: 5,313,796
[45] Date of Patent: May 24, 1994

[54] REMOTE COMPENSATION VALVES FOR A MASTER CYLINDER IN A BRAKE SYSTEM

[75] Inventors: Donald A. Crumb; Robert K. Wilson, both of Granger, Ind.

[73] Assignee: AlliedSignal Inc., Morristown, N.J.

[21] Appl. No.: 93,113

[22] Filed: Jul. 16, 1993

[51] Int. Cl.5 .............................................. B60T 13/20
[52] U.S. Cl. ..................................... 60/549; 60/584; 60/586; 60/591
[58] Field of Search ................. 60/549, 584, 585, 586, 60/590, 591

[56] References Cited

U.S. PATENT DOCUMENTS

| | | | |
|---|---|---|---|
| 3,406,519 | 10/1968 | Hackett | 60/584 |
| 4,490,979 | 1/1985 | Reynolds | 60/591 |
| 4,843,820 | 7/1989 | Gaiser et al. | 60/585 |
| 4,852,352 | 8/1989 | Leight-Monstevens | 60/585 |
| 4,976,190 | 12/1990 | Cooney | 60/591 |

FOREIGN PATENT DOCUMENTS

| | | | |
|---|---|---|---|
| 2335530 | 1/1974 | Fed. Rep. of Germany | 60/585 |
| 1044118 | 9/1966 | United Kingdom | 60/549 |

Primary Examiner—Edward K. Look
Assistant Examiner—F. Daniel Lopez
Attorney, Agent, or Firm—Leo H. McCormick, Jr.; Larry J. Palguta

[57] ABSTRACT

A remote compensation valve (20) through which pressurized fluid from a master cylinder (14) is communicated to the wheel brakes (24, 26) of a vehicle. The compensation valve (20) has a housing (200) with a bore (202) therein for retaining a shuttle piston (210). The shuttle piston (210) has a first land (212) separated from a second land (214) by a groove (216) and an axial bore (218) connected to the groove (216) by a radial bore (224). A first spring (250) carried by the piston (210) urges a poppet valve (244) toward a seat (230) to control the communication of pressurized fluid through the axial bore (218) to an outlet port. A second spring (254) located in the housing (200) urges the piston (210) toward a rest position where the first land (212) engages a pin (234) of a tilt valve (232) to establish communication between the source of fluid and the bore (202) and the poppet valve (244) is seated on the piston (210) to prevent communication through the axial bore (218). A manual input force on a first end (262) of a movable stop pin (250) brings a second end (266) into engagement with the poppet valve (244) to initiate communication between the compensation port (206) and the master cylinder (14) to remove any air from the master cylinder (14).

5 Claims, 4 Drawing Sheets

REMOTE COMPENSATION VALVES FOR A MASTER CYLINDER IN A BRAKE SYSTEM

This invention relates to a brake system having first and second remote compensation valves for a two piece master cylinder attached to a brake booster.

In designing current vehicles, the available under hood space has been shrinking with a change in the position of the engines, the addition of electronic equipment and pollution control devices and with the cab on some vehicles moved forward to provide more space in the passenger compartment. Further in some vehicles, the brake booster and associated master cylinder are surrounded by the body panels or fire wall such that it is difficult to service the brake system or even check or add brake fluid to the brake system. It has been suggested that the reservoir for the master cylinder could be positioned in a location remote from the master cylinder. Such remote reservoirs were initially disclosed in U.S. Pat. No. 1,835,580 and more recently in U.S. Pat. Nos. 5,003,780 and 5,083,433. While the use of such remote reservoirs would reduce the overall configuration of a brake booster and master cylinder, the master cylinder still extends a considerable distance from the brake booster.

We have devised a brake system having remote compensation valves to allow approximately one half of the housing of a master cylinder to be located within a brake booster to provide for a compact unitary structure that can be easily located on a firewall in available under hood space of a vehicle. In this configuration, the rear piston of the master cylinder is directly connected to the movable wall of the brake booster. The brake booster which is responsive to an input force is activated to develop an output force through the movement of a movable wall by a pressure differential to provide an input force to a master cylinder. Movement of the pistons in the master cylinder pressurize fluid which is thereafter communicated through remote first and second compensation valve connected to the wheel brakes of a vehicle to effect a brake application. By positioning a portion of the master cylinder in the brake booster, there is a considerable savings in the under hood space and with the remote compensation valves, adjustment between the movable wall and piston is eliminated such that pressurizing of fluid in the master cylinder can begin immediately in response to an output force from the brake booster.

In order to locate a master cylinder in the brake booster, we have devised remote first and second compensation valves which allows fluid from a reservoir to be supplied to a brake system. During a brake application, communication to the reservoir is interrupted and pressurized fluid from a master cylinder is immediately supplied without delay to the wheel brakes of a vehicle. Each compensation valve has a housing having a bore therein. The bore is connected to the master cylinder through an inlet port, to the reservoir through a compensation port and the wheel brakes through an outlet port. A shuttle piston located in the bore has a first land separated from a second land by a groove. The first land separates the inlet port from the compensation port and the outlet port. An axial bore in the piston extends from a first end to a second end and at least one radial bore extends from the axial bore to the groove to connect the inlet port with the outlet port. The axial bore has a first diameter separated from a second diameter by a shoulder. The first diameter receives a stem of a poppet valve while a head attached to the stem is located in the second diameter. An end cap attached to the piston cages a spring which acts on and urges the head toward the a seat formed on the shoulder. The poppet valve controls communication of fluid through the axial bore. A tilt valve located in the compensation port has a pin that extends through the bore in the housing into the groove in the piston. A return spring located in the bore acts on and urges the piston toward the inlet port to bring the first land into engagement with the pin on the tilt valve. The tilt valve controls communication through compensation port of fluid between a source of fluid in the reservoir and the bore. A movable stop pin retained in the housing has a first end external to the housing and a second end that extending into the axial bore of the shuttle piston. The return spring acts on a retainer disc to position the movable stop against a shoulder and define a normal operational position where by pressurized fluid from the master cylinder acts on and moves the shuttle valve to initially close the tilt valve and thereafter move seat on the shuttle valve away from the head of the poppet valve to allow pressurized fluid to be communicated to the wheel brakes and immediately begin to effect a brake application. In order to provide for removal of air from the brake system and in particular the chambers of the master cylinder, a manual input is applied to the movable stop pin which moves the poppet valve away from the shuttle valve an provides a flow path between the reservoir and the chambers of the master cylinder.

An advantage of this master cylinder with remote compensation occurs by locating approximately one half of the two piece housing in the brake booster with a pressurizing piston in the master cylinder directly connected to a movable wall to eliminate the need for adjustment between the movable wall and pistons in the master cylinder while producing compact unitary structure.

An object of this invention is to provide a remote compensation valve with means to manually move a poppet valve and allow for replenishment of any fluid lost from a brake system.

A further object of this invention is to provide a master cylinder and brake booster arrangement with first and second remote compensation valve through which the wheel brakes of a vehicle are supplied pressurized fluid to effect a brake application.

These objects and advantages should be apparent from reading this specification while viewing the drawings wherein.

Figure 1:
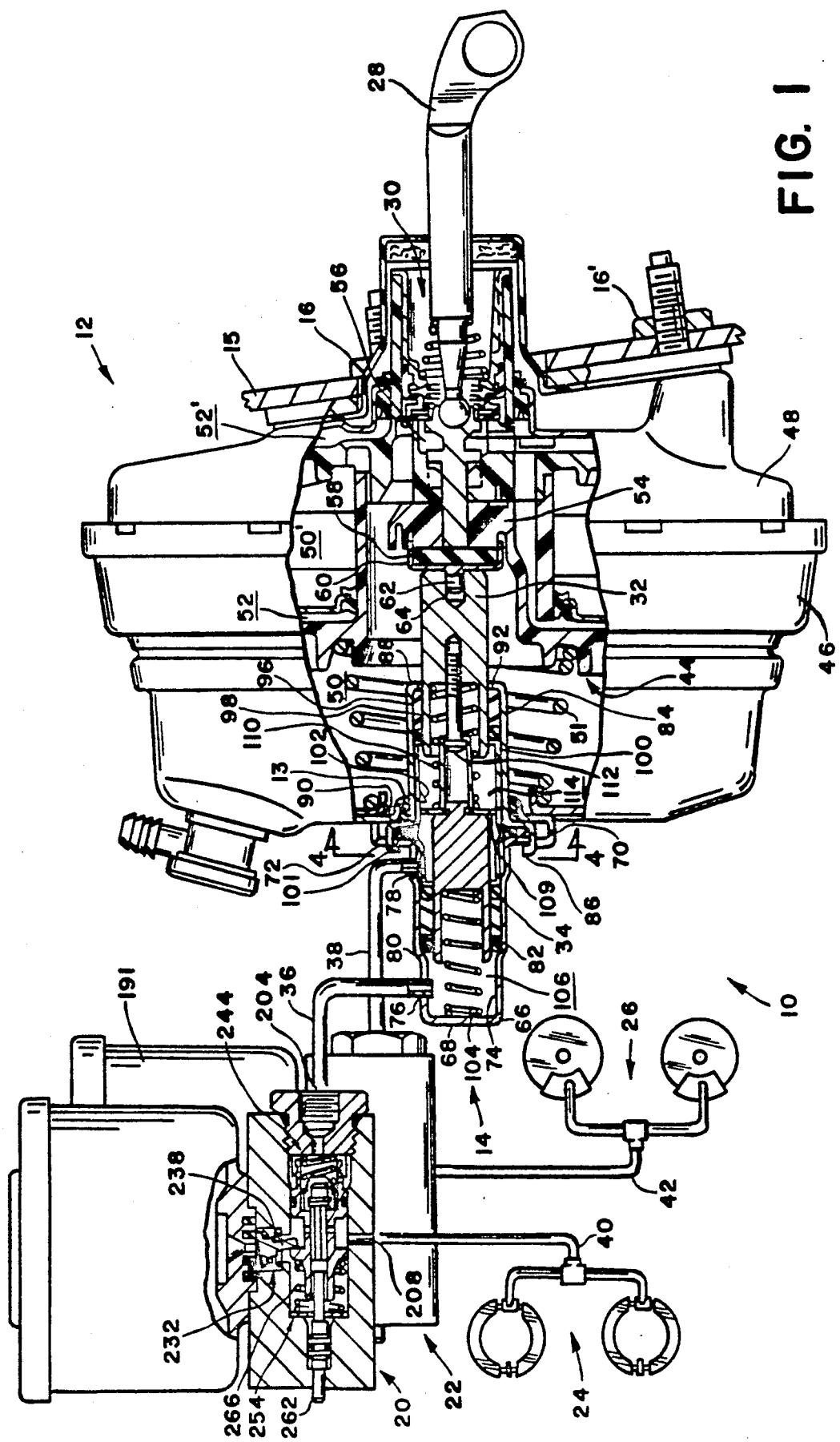
FIG. 1 is an illustration of a brake system having a remote compensation valves connected to a master cylinder and brake booster arrangement and the wheel brakes of a vehicle, the remote compensation valves being made in accordance with the principles of the present invention.

The brake system 10 as shown in FIG. 1 includes a brake booster 12 which is attached to the firewall 15 of a vehicle by bolts 16, 16', a master cylinder 14 attached to the brake booster 12 and first 20 and second 22 remote compensation valves attached to rear wheel brakes 24 and front wheel brakes 26 of the vehicle. In response to an input force applied to push rod 28, control valve 30 in brake booster 12, which functionally is of a type as disclosed in U.S. patent application Ser. No. 843,678, is activated to develop an output force through a operational pressure differential. The output force is applied as input force to immediately move the operational pistons 32 and 34 in the master cylinder 14 to pressurize fluid which is communicated by lines 36 and 38 to first 20 and second 22 remote compensation valves, respectively, for presentation by line 40 to the rear wheel brakes 24 and by line 42 to front wheel brakes 26 to effect a brake application.

In more particular detail, the brake booster 12 in addition to the control valve 30 has a movable wall 44 which separates the interior of front and rear shells 46 and 48 into a front chambers 50, 50' and a rear chambers 52, 52'. The movable wall 44 has a hub 54 with a bore 56 therein for retention of control valve 30 and communication between the front chambers 50, 50', rear chambers 52, 52' and the environment. A reaction disc 58 retained in cup member 60 is positioned on hub 54 to receive to output force developed through movement of wall 44. Cup member 60 has a projection or guide pin 62 which is aligned in bore 64 within piston 32 of the master cylinder 14.

Figure 4:
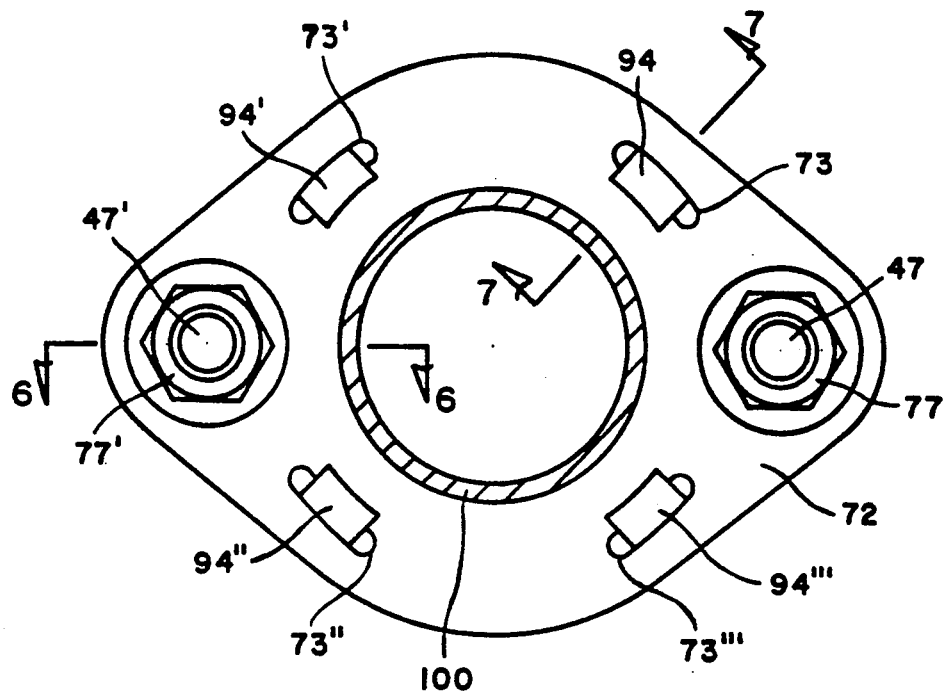
FIG. 4 is an enlarged sectional view taken along line 4—4 of FIG. 1 showing the flange connection for the two piece master cylinder.
Figure 6:
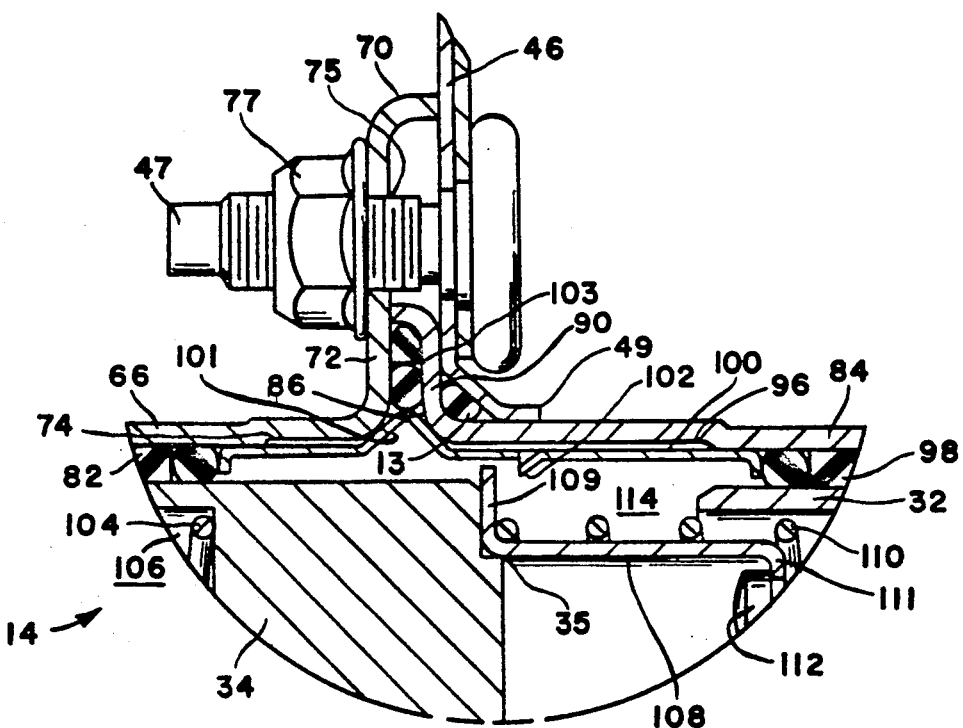
FIG. 6 is an enlarged section view taken along line 6—6 of FIG. 4.
Figure 7:
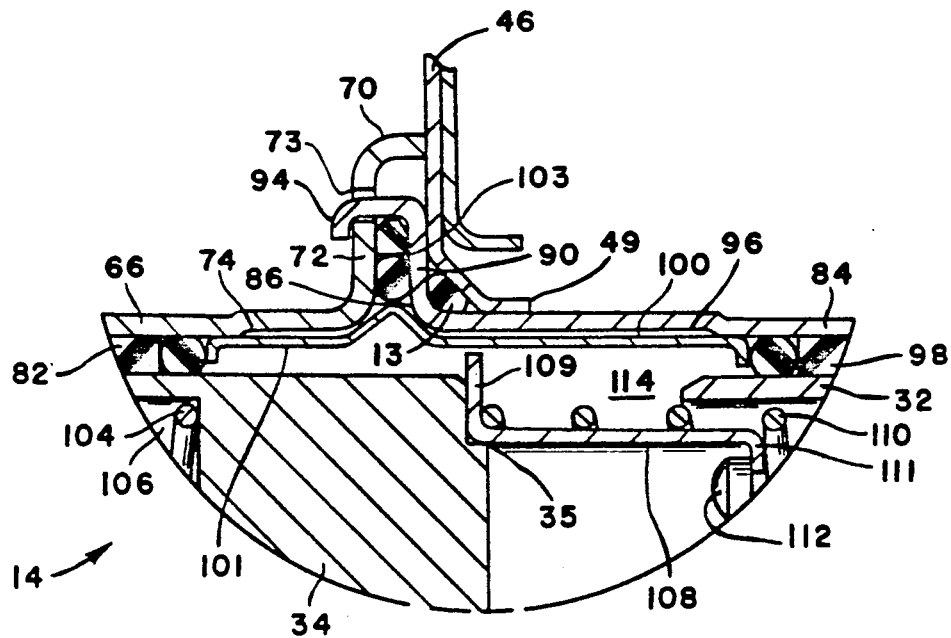
FIG. 7 is an enlarged sectional view taken along line 7—7 of FIG. 4.

The two piece master cylinder 14 has a first cylindrical housing 66 and a second cylindrical housing 84. The first cylindrical housing 66 has a first end 68 and a second end 70. The second end 70 has a first outwardly projecting annular flange 72 with a plurality of slots 73, 73', 73" and 73'" located thereon and openings 75, 75' for attachment to bolts 47, 47' extending from shell 46 of the brake booster 12, see FIG. 4, 6 and 7. The housing 66 has a blind axial bore 74 that substantially extends from the second end 70 to the first end 68. The blind bore 74 has a first outlet port 76 adjacent the first end 68 and a second outlet port 78 adjacent the second end 70. An annular shoulder 80 is located between the first 76 and second 78 outlet ports to define a stop for a first seal and bearing arrangement 82 located in bore 74.

The second cylindrical housing 84 has a first end 86 and a second end 88. The first end 86 has a second outwardly projecting flange 90 and the second end 88 has an inwardly projecting flange 92. The outwardly projecting flange 90 has a plurality of tabs 94, 94', 94" and 94'" that extend through slots 73, 73', 73" and 73'" and are crimped on flange 72 to form a unitary structure, see FIGS. 4, 6 and 7. The second housing 84 has an axial bore 96 that extends from the second outwardly projecting flange 90 to the inwardly projecting flange 92. A second seal and bearing arrangement 98 which is located in axial bore 96 adjacent the inwardly projecting flange 92 engages piston 32. A sleeve 100 located in blind bore 74 and axial bore 96 holds the first 82 and second 98 seal and bearing arrangements in a substantially stationary position. Sleeve 100 has an annular projection 101 for positioning a seal and backup ring 103 between flanges 72 and 92 to initially seal bores 74 and 96 from the surrounding environment when the second housing 84 is joined to the first housing 66 to form a unitary structure.

A first spring 104 is located in the blind bore 74 and engages the first piston 34 to define a first chamber 106 within the unitary structure while a caging arrangement is located between pistons 32 and 34 in axial bore 96 to define a second chamber 114. The caging arrangement includes a retainer 108 with a first flange 109 which is located on ledge 35 on piston 34, return spring 110 and a bolt 112 which engages a second flange 111 of retainer 108 to attached retainer 108 to piston 32. The length of bolt 112 of the caging arrangement sets the limits the extension of return spring 110 and thereby defines a maximum displacement volume for chamber 114. In order to prevent the pistons 32 and 34 from being pushed out of the unitary structure by return spring 104 after the master cylinder 14 is assembled and before being attached to shell 46, sleeve 100 has plurality of inwardly projections 102, only one of which is shown, that engage retainer flange 109. Further, that portion of the second piston 32 which extends past inwardly projecting flange 92 in the second housing 84 has a bore 64 therein for receiving projection 62 on cup 60 connected to movable wall 44 to assure that piston 32 is aligned within bore 96.

The master cylinder 14 is attached to shell 46 by first locating the second housing 84 in opening 49 in shell 46 and aligning openings 47, 47 on bolts 75, 75' with the first 76 and second 78 outlet ports in a top position as shown in FIG. 1. As later discussed herein, with the outlet ports in this location, bleeding of air from the system may be better achieved. Nuts 77, 77' are placed on bolts 75, 75' and tightened to bring the first outwardly projecting flange 72 toward shell 46 of brake booster 12 while at the same time the second flange 90 engages seal 13 in opening 49 to seal chamber 50 from the surrounding environment. As nuts 77, 77' are tightened, seal and back up member 103 are further compressed between flanges 72 and 90 to seal chamber 114 from the surrounding environment. Once master cylinder 14 is attached to shell 46, the end of piston 32 engages cup 60 on movable wall 44 such that any output force produced by the movable wall is immediately transferred into pistons 32 and 34 for pressurizing fluid in chambers 106 and 114 to develop pressurized fluid which is supplied to the remote first and second compensation valves 20 and 22.

Figure 2:
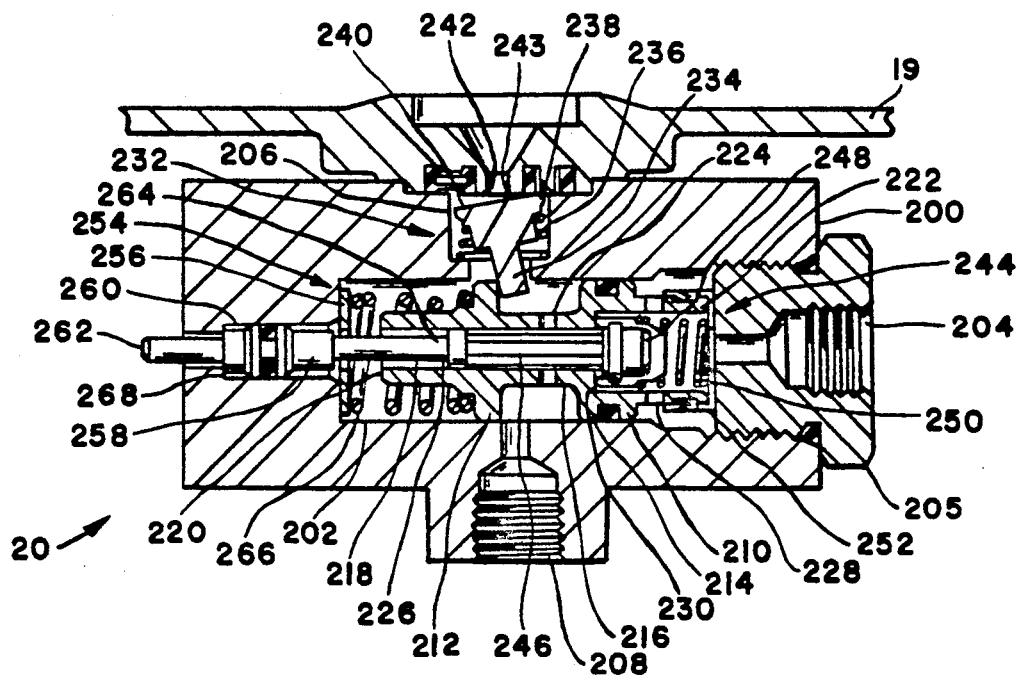
FIG. 2 is an enlarged sectional view of a remote compensation valve of FIG. 1 in the rest position and in the absence of pressurized fluid being presented from the master cylinder.
Figure 3:
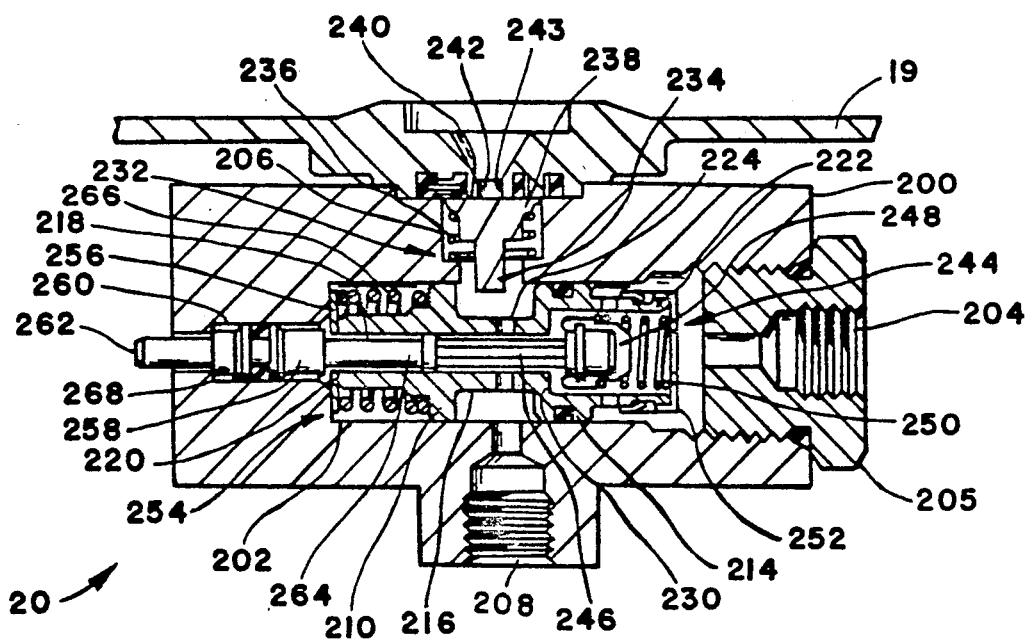
FIG. 3 is an enlarged sectional view of the remote compensation valve of FIG. 2 in a fully operational position in response to receiving pressurizing fluid from the master cylinder.
Figure 5:
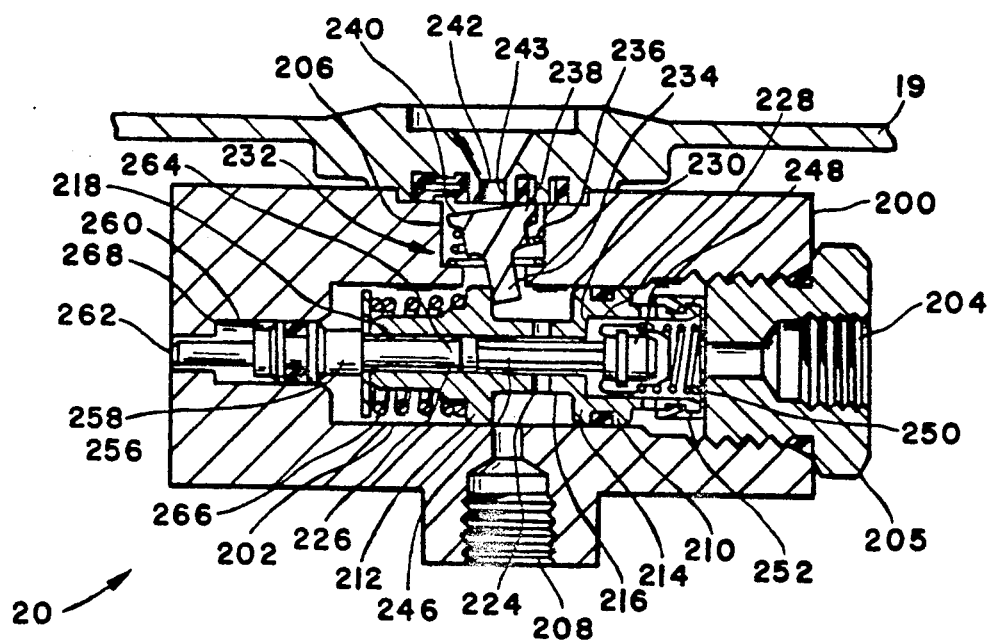
FIG. 5 is an enlarged sectional view of a remote compensation valve of FIG. 1 wherein a poppet valve therein is manually moved to a position to allow communication between a source of fluid in a reservoir and a fluid pressurizing chamber in the master cylinder.

The remote compensation valves 20 and 22 through which pressurized fluid is supplied to the rear 24 and front 26 wheel brakes to effect a brake application for the vehicle are structurally and functionally the same and only valve 20 shown in FIG. 2, 3 and 5 is hereinafter described in detail.

Valve 20 has a housing 200 with a bore 202 therein. Bore 202 is connected to line 36 by an inlet port 204 in end cap 205, to reservoir 19 by a compensation port 206 and to line 40 by an outlet port 208. A shuttle piston 210 located in bore 202 has a first land 212 separated from a second land 214 by a groove 216. Land 214 and retained O-ring seal separates the inlet port 204 from the compensation port 206 and outlet port 208. Piston 210 has an axial bore 218 therein that extends from a first end 220 to a second end 222 and at least one radial bore 224 that extends from the axial bore 218 to groove 216 to connect the inlet port 204 with the outlet port 208. The axial bore 218 in piston 210 has a first diameter 226 separated from a second diameter 228 by a shoulder 230.

A tilt valve 232 located in compensation port 206 of housing 200 has a pin 234 that extends into groove 216 in piston 210. A spring 236 acts on head 238 of the tilt valve to urge face 240 to a seat 242 surrounding opening 243 in the reservoir 19 to control communication into bore 202 of housing 200.

A poppet valve 244, of a type disclosed in U.S. Pat. No. 5,214,917 has a stem 246 located in the first diameter 226 of bore 218 and a head 248 attached to stem 246 that is located in the second diameter 228. A cap 252 attached to piston 210 retains a spring 250 which urges head 248 on poppet valve 244 toward shoulder 230 to control the flow of fluid through axial bore 218 in piston 210. Spring means 254 located in bore 202 urges piston 210 toward inlet port 204 to bring the first land 212 into engagement with pin 234 on tilt valve 232 and initiate communication of fluid between opening 243 for a source of fluid in reservoir 19 and bore 202 through compensation port 206, as shown in FIG. 2. Spring means 254 has a disc 256 carried on movable stop pin 258 retained in bore 260 of housing 200. Movable stop pin 258 has a first end 262 which is external to housing 200 and a second end 264 that extending into axial bore 218 of piston 210. The coils 266 of spring means 254 which are located between disc 256 and land 212 urges annular flange 268 on movable stop pin 258 into engagement with housing 200 and land 212 into engagement with pin 234 to define a rest position as shown in FIG. 2. In this position, free communication of fluid occurs between reservoir 19, bore 202 and outlet ports 208, 208' connected by line 40 to the rear wheel brakes 24 and by line 42 to the front wheel brakes 26. However, it should also be understood in this rest position that head 248 on poppet valve 244 is seated on face 230 and as a result, chambers 106 and 114 in master cylinder 14 are isolated from the source of fluid in reservoir 19,19'.

During a brake application, an input force applied to push rod 28 activates control valve 30 to develop a pressure differential between chambers 50, 50' and 52, 52' and create an output force. The output force after overcoming return spring 51 moves movable wall 44 to provide an input force which is directly communicated through reaction disc 58 and cup member 60 to the end of piston 32 of the master cylinder 14. Movement of piston 32 is carried through caged spring 110 to piston 34 and as a result simultaneous pressurization of fluid occurs in chambers 106 and 114. The pressurized fluid is communicated to remote compensation valves 20 and 22 for distribution to the rear 24 and front 26 wheel brakes of the vehicle. The size and strength of the coils 266 of spring means 254 in remote compensation valves 20 and 22 can be the same or different depending on the need or desire to delay the actuation of the front wheel brakes 26 until after the rear wheel brakes 24. The pressurizing fluid which is communicated to the inlet port 204, by way of example, to remote compensation valve 20 acts on shuttle piston 210 and overcomes spring means 254 initially moves land 212 away from pin 234 and allows spring 236 to urge face 240 against seat 242 to terminate fluid communication from reservoir 19 through compensation port 206 to bore 202. After shuttle valve 210 has moved through a predetermined stroke or distance, the end of stem 246 on poppet valve 244 engages the end 264 on movable stop pin 258. As best shown in FIG. 3, once fluid communication with the reservoir 19 terminates, the poppet valve 244 remains stationary with further movement of shuttle piston 210 such that face 230 moves away from head 248 to initiate communication of pressurized fluid from the inlet port 204 to the outlet port 208 by way of axial bore 226 and radial bore 224 to effect a brake application. When a brake application is completed and in the absence of pressurized fluid being presented to inlet port 204, spring means 254 moves shuttle piston 210 to initially bring seat 230 into engagement with head 248 and to interrupt communication of fluid through bore 218. Thereafter land 212 engages pin 234 of tilt valve 232 to reestablish communication of fluid through opening 243 from the source of fluid in reservoir 19 through compensation port 206 to bore 202 as illustrated in FIG. 2. At the same time, return spring 51 repositions wall 44 of brake booster 12 in its rest position as shown in FIG. 1.

During manufacture of a vehicle lines 36 and 38 are connected to the master cylinder 14. Once all of the connections are made in the brake system, brake fluid is added and the system is vacuum bleed. To assure that air is removed from chambers 106 and 114, a manual input is applied to end 262 of movable stop 258 to compress coils 266 in spring means 254 and bring end 264 into engagement with stem 246 to move head 248 away from seat 230 and establish communication between reservoir 19 to outlet port 204, as shown in FIG. 5. Fluid from reservoir 19 is communicated to chambers 106 and 114 as air is evacuated from the system. Removal of air from the system assures that an input force applied to pistons 32 and 34 pressurizes fluid rather than compressing air during a brake application.

We claim:

1. A brake system having a brake booster responsive to an input force for developing an output force to move pistons in a master cylinder and immediately pressurize fluid therein which is communicated through remote first and second compensation valves to activate wheel brakes of a vehicle and effect a brake application, each of said remote first and second compensation valves comprising:

a housing having a bore therein with an inlet port, a compensation port and an outlet port;

a piston located in said bore having a first land separated from a second land by a groove, said second land separating said inlet port from said compensation port and said outlet port, said piston having a axial bore therein that extends from a first end to a second end and at least one radial bore that extends from said axial bore to said groove to connect said inlet port with said groove, said axial bore having a first diameter separated from a second diameter by a shoulder;

a tilt valve located in said compensation port having a pin that extends through said bore in said housing and into said groove in said piston;

a poppet valve having a stem located in said first diameter and a head attached to said stem and located in said second diameter of said axial bore of said piston;

first spring means for urging said head of said poppet valve toward said shoulder on said piston;

second spring means for urging said piston toward said inlet port to bring said first land into engagement with said pin on said tilt valve and initiate communication of fluid between a source of fluid and said bore through said compensation port; and a movable stop pin retained in said housing with a first end external to said housing and a second end extending into said axial bore of said piston, said second spring means urging a annular flange on said movable stop pin into engagement with said housing to define an operational position whereby movement of said piston by pressurized fluid from the master cylinder in overcoming said second spring moves said first land out of engagement with said tilt valve pin to allow said tilt valve to interrupt communication of fluid from said source through said compensation port and bring said stem into engagement with said second end of said movable stop pin to initiate communication of pressurized fluid from said inlet port to the outlet port to effect a brake application, said second spring means in the absence of said pressurized fluid moving said piston to bring said first land into engagement with said tilt valve and reestablish communication of fluid from said source through said compensation port and move said stem out of engagement with said second end of the movable stop pin to allow said first spring means to seat said head on said shoulder in said axial bore and interrupt communication from the inlet port to said outlet port, said movable stop responding to a manual input force applied to said first end to overcome said second spring means and bring said second end into engagement with said stem of said poppet valve and move said head off said shoulder to establish fluid communication between said inlet port and said compensation port.

2. In the brake system as recited in claim 1 further includes a disc located between said second spring means and said housing, said movable stop engaging said disc in response to the manual input force to compress said second spring means and bring said second end into engagement with said stem to unseat said head from said annular shoulder in said piston and establish communication between said inlet port and said compensation port.

3. In the brake system as recited in claim 2 wherein communication of pressurized fluid from the inlet port through said axial bore of the piston in addition to being communicated to the outlet port is communicated to and acts on said tilt valve to interrupt communication of the source of fluid through said compensation port.

4. In the brake system as recited in claim 3 wherein said second spring means in said remote first and second compensation valves have different strength to provide for different rates of communication to the various wheel brakes.

5. In the brake system as recited in claim 4 wherein said first compensation valve is connected to the front wheel brakes and said second compensation valve is connected to the rear wheel brakes, said pressurized fluid being communicated to said rear wheel brakes prior to being communicated to said front wheel brakes.

* * * * *